United States Patent
Kamiya et al.

(10) Patent No.: US 12,091,537 B2
(45) Date of Patent: Sep. 17, 2024

(54) COMPOSITION AND MOLDED ARTICLE CONTAINING FLUORINE-CONTAINING POLYMER

(71) Applicant: DAIKIN INDUSTRIES, LTD., Osaka (JP)

(72) Inventors: Fumihiro Kamiya, Osaka (JP); Tsuyoshi Noguchi, Osaka (JP); Seiichi Hirano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 780 days.

(21) Appl. No.: 17/265,343

(22) PCT Filed: Jul. 29, 2019

(86) PCT No.: PCT/JP2019/029642
§ 371 (c)(1),
(2) Date: Feb. 2, 2021

(87) PCT Pub. No.: WO2020/027046
PCT Pub. Date: Feb. 6, 2020

(65) Prior Publication Data
US 2021/0317295 A1     Oct. 14, 2021

(30) Foreign Application Priority Data

Aug. 3, 2018   (JP) ................................ 2018-147204
Jul. 29, 2019  (JP) ................................ 2019-138605

(51) Int. Cl.
| | | |
|---|---|---|
| C08L 27/12 | (2006.01) | |
| C08F 2/06 | (2006.01) | |
| C08F 6/12 | (2006.01) | |
| C08F 20/06 | (2006.01) | |
| C08K 3/28 | (2006.01) | |

(52) U.S. Cl.
CPC ............... *C08L 27/12* (2013.01); *C08F 2/06* (2013.01); *C08F 6/12* (2013.01); *C08F 20/06* (2013.01); *C08K 3/28* (2013.01)

(58) Field of Classification Search
CPC .... C08F 2/06; C08F 2/08; C08F 20/06; C08F 220/06; C08F 220/14; C08K 3/28; C08L 27/00–24
See application file for complete search history.

(56) References Cited

U.S. PATENT DOCUMENTS

| | | |
|---|---|---|
| 2006/0128870 A1 | 6/2006 | Marx et al. |
| 2010/0021694 A1 | 1/2010 | Wakizaka et al. |
| 2014/0221556 A1 | 8/2014 | Yoshida et al. |
| 2018/0179374 A1 | 6/2018 | Noguchi et al. |

FOREIGN PATENT DOCUMENTS

| | | |
|---|---|---|
| CN | 104046012 A | 9/2014 |
| CN | 105968683 A | 9/2016 |
| CN | 107636066 A | 1/2018 |
| EP | 0 212 621 A2 | 3/1987 |
| EP | 2 762 538 A1 | 8/2014 |
| JP | 2005-008651 A | 1/2005 |
| JP | 2008-75078 A | 4/2008 |
| JP | 2008-523224 A | 7/2008 |
| JP | 2013-228741 A | 11/2013 |
| KR | 10-2014-0067149 A | 6/2014 |
| KR | 10-2018-0018776 A | 2/2018 |
| WO | 2016/204272 A1 | 12/2016 |

OTHER PUBLICATIONS

International Preliminary Report on Patentability dated Feb. 9, 2021 and translation of the Written Opinion from the International Bureau in International Application No. PCT/JP2019/029642.
International Search Report for PCT/JP2019/029642 dated, Oct. 21, 2019 (PCT/ISA/210).
Supplementary European Search Report issued Mar. 22, 2022 in European Application No. 19843590.1.

*Primary Examiner* — Ana L. Woodward
(74) *Attorney, Agent, or Firm* — Sughrue Mion, PLLC

(57) ABSTRACT

A composition including a composite particle and a fluorine-containing polymer, wherein the composite particle comprises a polymer and an inorganic particle dispersed in the polymer, and the polymer contains an acid group-containing monomer unit. Also disclosed is a molded article obtained from the composition.

14 Claims, No Drawings

COMPOSITION AND MOLDED ARTICLE CONTAINING FLUORINE-CONTAINING POLYMER

CROSS REFERENCE TO RELATED APPLICATIONS

This application is a National Stage of International Application No. PCT/JP2019/029642 filed on Jul. 29, 2019, claiming priority based on Japanese Patent Application No. 2018-147204 filed Aug. 3, 2018, and Japanese Patent Application 2019-138605 filed Jul. 29, 2019.

TECHNICAL FIELD

The present disclosure relates to a composition comprising a fluorine-containing polymer and a molded article.

BACKGROUND ART

Compositions comprising a fluorine-containing polymer such as a fluorine-containing elastomer have excellent heat resistance, chemical resistance, solvent resistance, fuel oil resistance, and the like, and are therefore widely used to manufacture molded articles such as O-rings, hoses, stem seals, shaft seals, and diaphragms. As such a composition, for example, in Patent Literature 1, there is proposed a composition including a composite particle and a fluorine-containing polymer, wherein the composite particle comprises a polymer and an inorganic particle dispersed in the polymer.

RELATED ART

Patent Documents

Patent Document 1: International Publication No. 2016/204272

SUMMARY OF THE INVENTION

Problem to be Solved by the Invention

An object of the present disclosure is to provide a composition comprising a fluorine-containing polymer that has excellent scorch resistance.

Means for Solving the Problem

According to the present disclosure, provided is a composition comprising a composite particle and a fluorine-containing polymer, wherein the composite particle comprises a polymer and an inorganic particle dispersed in the polymer, and the polymer contains an acid group-containing monomer unit.

The acid group-containing monomer unit is preferably an unsaturated carboxylic acid unit.

The acid group-containing monomer unit is preferably a methacrylic acid unit.

The content of the acid group-containing monomer unit of the polymer is preferably 1 to 100 mol % with respect to all the monomer units.

The fluorine-containing polymer is preferably a fluorine-containing elastomer.

The inorganic particle is preferably an inorganic nitride particle.

The composite particle is preferably obtained by polymerizing an acid group-containing monomer in a dispersion in which the inorganic particle is dispersed.

The composition is preferably a molding material.

Further, according to the present disclosure, a molded article obtained from the above-described composition is provided.

Effects of Invention

According to the present disclosure, a composition comprising a fluorine-containing polymer that has excellent scorch resistance can be provided.

DESCRIPTION OF EMBODIMENTS

Specific embodiments of the present disclosure will now be described in detail. However, the present disclosure is not limited to the following embodiments.

The composition of the present disclosure comprises a fluorine-containing polymer. As the fluorine-containing polymer, a fluorine-containing elastomer is preferable because it has excellent sealing properties, chemical resistance, and heat resistance.

In the present disclosure, the fluorine-containing elastomer is an amorphous fluorine-containing polymer. "Amorphous" refers to a state in which the melting peak ($\Delta H$) that appears in differential scanning calorimetry [DSC] (temperature-increasing rate 10° C./min) or differential thermal analysis [DTA] (temperature-increasing rate 10° C./min) of the fluorine-containing polymer is 4.5 J/g or less. Fluorine-containing elastomers exhibit elastomeric characteristics through cross-linking. "Elastomeric characteristics" means characteristics that allow the polymer to be stretched and to retain its original length when the force required to stretch the polymer is no longer applied.

The fluorine-containing elastomer may be a partially fluorinated elastomer or a perfluoroelastomer, but it is preferable to use a perfluoroelastomer from the viewpoint of having even better chemical resistance and heat resistance.

In the present disclosure, the partially fluorinated elastomer is a fluorine-containing polymer comprising a fluoromonomer unit and having a perfluoromonomer unit content of less than 90 mol % with respect to all the monomer units, wherein the glass transition temperature is 20° C. or lower and the melting peak ($\Delta H$) is 4.5 J/g or less.

In the present disclosure, the perfluoroelastomer is a fluorine-containing polymer having a perfluoromonomer unit content of 90 mol % or more with respect to all the monomer units, wherein the glass transition temperature is 20° C. or lower and the melting peak ($\Delta H$) is 4.5 J/g or less, and wherein the fluorine atom concentration in the fluorine-containing polymer is 71% by mass or more. In the present disclosure, the fluorine atom concentration in the fluorine-containing polymer is determined by calculating the concentration (% by mass) of the fluorine atoms included in the fluorine-containing polymer from the type and content of each monomer constituting the fluorine-containing polymer.

In the present disclosure, the perfluoromonomer is a monomer that does not include a carbon atom-hydrogen atom bond in the molecule. The perfluoromonomer may be a monomer in which, in addition to carbon atoms and fluorine atoms, some of the fluorine atoms bonded to carbon atoms are replaced with chlorine atoms, and may have, other than carbon atoms, a nitrogen atom, an oxygen atom, and a sulfur atom. The perfluoromonomer is preferably a monomer in which all the hydrogen atoms are replaced with fluorine atoms. A monomer that provides a cross-linking site does not fall within the scope of the perfluoromonomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, and the like. Among these, at least one selected from the group consisting of vinylidene fluoride-based fluoroelastomers and tetrafluoroethylene/propylene-based fluoroelastomers is preferable.

The vinylidene fluoride-based fluoroelastomer is preferably a copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a copolymer comprising 50 to 80 mol % of vinylidene fluoride and 50 to 20 mol % of at least one other monomer copolymerizable with vinylidene fluoride.

In the present disclosure, the content of each monomer constituting the fluorine-containing polymer can be calculated by appropriately combining NMR, FT-IR, elemental analysis, and X-ray fluorescence analysis depending on the type of monomer.

Examples of the at least one other monomer copolymerizable with vinylidene fluoride include TFE, HFP, fluoroalkyl vinyl ether, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by formula (1): $CH_2=CFRf^1$ wherein $Rf^1$ is a linear or branched fluoroalkyl group having 1 to 12 carbon atoms, and a fluoromonomer represented by formula (2): $CH_2=CH-(CF_2)_n-X^2$ wherein $X^2$ is H or F, and n is an integer of 3 to 10; a monomer that provides a crosslinking site; and a non-fluorinated monomer such as ethylene, propylene, and alkyl vinyl ether. These can be used alone or in any combination. Among these, it is preferable to use at least one selected from the group consisting of TFE, HFP, fluoroalkyl vinyl ether and CTFE.

The fluoroalkyl vinyl ether is preferably one selected from the group consisting of a fluoromonomer represented by formula (3):

$CF_2=CF-ORf^3$ wherein $Rf^3$ represents a perfluoroalkyl group having 1 to 8 carbon atoms;
a fluoromonomer represented by formula (4):

$CF_2=CFOCF_2ORf^4$ wherein $Rf^4$ is a linear or branched perfluoroalkyl group having 1 to 6 carbon atoms, a cyclic perfluoroalkyl group having 5 to 6 carbon atoms, or a linear or branched perfluorooxyalkyl group having 2 to 6 carbon atoms including 1 to 3 oxygen atoms; and
a fluoromonomer represented by formula (5):

$CF_2=CFO(CF_2CF(Y^5)O)_m(CF_2)_nF$ wherein $Y^5$ represents a fluorine atom or a trifluoromethyl group, M is an integer of 1 to 4, and n is an integer of 1 to 4. More preferably, the fluoroalkyl vinyl ether is a fluoromonomer represented by formula (3).

Specific examples of the vinylidene fluoride-based fluoroelastomer include a VdF/HFP-based rubber, a VdF/HFP/TFE-based rubber, VdF/CTFE-based rubber, a VdF/CTFE/TFE-based rubber, a VDF/fluoromonomer represented by formula (1)-based rubber, a VDF/fluoromonomer represented by formula (1)/TFE-based rubber, a VDF/perfluoro (methyl vinyl ether) [PMVE]-based rubber, a VDF/PMVE/TFE-based rubber, a VDF/PMVE/TFE/HFP-based rubber and the like. The VDF/fluoromonomer represented by formula (1)-based rubber is preferably a VDF/$CH_2=CFCF_3$-based rubber, and the VDF/fluoromonomer represented by formula (1)/TFE-based rubber is preferably VDF/TFE/$CH_2=CFCF_3$-based rubber.

The VDF/$CH_2=CFCF_3$-based rubber is preferably a copolymer comprising 40 to 99.5 mol % of VDF and 0.5 to 60 mol % of $CH_2=CFCF_3$, and more preferably 50 to 85 mol % of VDF and 15 to 50 mol % of $CH_2=CFCF_3$.

The tetrafluoroethylene/propylene-based fluoroelastomer is preferably a copolymer comprising 45 to 70 mol % of tetrafluoroethylene, 55 to 30 mol % of propylene, and 0 to 5 mol % of fluoromonomer that provides a crosslinking site.

The fluorine-containing elastomer may be a perfluoroelastomer. Examples of the perfluoroelastomer include at least one selected from the group consisting of a perfluoroelastomer including TFE, for example, a copolymer of TFE/fluoromonomer represented by formula (3), (4), or (5), and a copolymer of TFE/fluoromonomer represented by formula (3), (4), or (5)/monomer that provides a crosslinking site.

In the case of a TFE/PMVE copolymer, the compositional features thereof are preferably 45 to 90/10 to 55 (mol %), more preferably 55 to 80/20 to 45, and further preferably 55 to 70/30 to 45.

In the case of a copolymer of TFE/PMVE/monomer that provides a crosslinking site, the compositional features thereof are preferably 45 to 89.9/10 to 54.9/0.01 to 4 (mol %), more preferably 50 to 77.9/20 to 49.9/0.1 to 3.5, and further preferably 55 to 69.8/30 to 44.8/0.2 to 3.

In the case of a copolymer of TFE/fluoromonomer represented by formula (3), (4), or (5) having 4 to 12 carbon atoms, the compositional features thereof are preferably 50 to 90/10 to 50 (mol %), more preferably 60 to 88/12 to 40, and further preferably 65 to 85/15 to 35.

In the case of a copolymer of TFE/fluoromonomer represented by formula (3), (4), or (5) having 4 to 12 carbon atoms/monomer that provides a crosslinking site, the compositional features thereof are preferably 50 to 89.9/10 to 49.9/0.01 to 4 (mol %), more preferably 60 to 87.9/12 to 39.9/0.1 to 3.5, and further preferably 65 to 84.8/15 to 34.8/0.2 to 3.

If the compositional features of these copolymers are beyond these ranges, their nature as a rubber elastic body is lost, and the copolymer tends to have a nature close to that of a resin.

Examples of the perfluoroelastomer include at least one selected from the group consisting of a copolymer of TFE/fluoromonomer represented by formula (5)/monomer that provides a crosslinking site, a copolymer of TFE/fluoromonomer represented by formula (5), a copolymer of TFE/fluoromonomer represented by formula (3), and a copolymer of TFE/fluoromonomer represented by formula (3)/monomer that provides a crosslinking site.

Examples of the perfluoroelastomer may include the perfluoroelastomers described in International Publication No. WO 97/24381, Japanese Patent Publication No. 61-57324, Japanese Patent Publication No. 4-81608, Japanese Patent Publication No. 5-13961, and the like.

The monomer that provides a crosslinking site is a monomer (cure site monomer) having a crosslinkable group that provides a fluorine-containing polymer with a crosslinking site for forming a crosslink by a cross-linking agent.

The monomer that provides a crosslinking site is preferably at least one selected from the group consisting of:
a fluoromonomer represented by formula (6):

$$CX^6{}_2\!=\!CX^6\!-\!Rf^6CHR^6X^7$$

wherein each $X^6$ is the same or different and is a hydrogen atom, a fluorine atom, or $CH_3$, $Rf^6$ is a fluoroalkylene group, a perfluoroalkylene group, a fluoro(poly)oxyalkylene group, or a perfluoro(poly)oxyalkylene group, $R^6$ is a hydrogen atom or $CH_3$, and $X^7$ is an iodine atom or a bromine atom;
a fluoromonomer represented by formula (7):

$$CX^6{}_2\!=\!CX^6\!-\!Rf^7X^7$$

wherein each $X^6$ is the same or different, and is a hydrogen atom, a fluorine atom, or $CH_3$, $Rf^7$ is a fluoroalkylene group, a perfluoroalkylene group, a fluoro(poly)oxyalkylene group, or a perfluoro(poly)oxyalkylene group, and $X^7$ is an iodine atom or a bromine atom;
a fluoromonomer represented by formula (8):

$$CF_2\!=\!CFO(CFO)CF_2CF(CF_3)O)_m(CF_2)_n\!-\!X^8$$

wherein m is an integer of 0 to 5, n is an integer of 1 to 3, and $X^8$ is a cyano group, a carboxyl group, an alkoxycarbonyl group, an iodine atom, a bromine atom, or $-CH_2I$;
a fluoromonomer represented by formula (9):

$$CH_2\!=\!CFCF_2O(CF(CF_3)CF_2O)_m(CF(CF_3))_n\!-\!X^9$$

wherein m is an integer of 0 to 5, n is an integer of 1 to 3, and $X^9$ is a cyano group, a carboxyl group, an alkoxycarbonyl group, an iodine atom, a bromine atom, or $CH_2OH$; and
a monomer represented by formula (10):

$$CR^{10}{}_2\!=\!CR^{10}\!-\!Z\!-\!CR^{10}\!=\!CR^{10}{}_2$$

wherein each $R^{10}$ is the same or different and is a hydrogen atom or an alkyl group having 1 to 5 carbon atoms, and Z is a linear or branched alkylene group having 1 to 18 carbon atoms which may have an oxygen atom, a cycloalkylene group having 3 to 18 carbon atoms, an alkylene group or an oxyalkylene group having 1 to 10 carbon atoms which is at least partially fluorinated, or a (per)fluoropolyoxyalkylene group having a molecular weight of 500 to 10000 and represented by $$\text{-}(Q)_p\text{-}CF_2O\text{—}(CF_2CF_2O)_m(CF_2O)_n\text{—}CF_2\text{-}(Q)_p\text{-}$$

wherein Q is an alkylene group or an oxyalkylene group, P is 0 or 1, and m/n is 0.2 to 5.

$X^6$ is preferably a fluorine atom. $Rf^6$ and $Rf^7$ are preferably a perfluoroalkylene group having 1 to 5 carbon atoms. $R^6$ is preferably a hydrogen atom. $X^8$ is preferably a cyano group, an alkoxycarbonyl group, an iodine atom, a bromine atom, or $-CH_2I$. $X^9$ is preferably a cyano group, an alkoxycarbonyl group, an iodine atom, a bromine atom, or $-CH_2OH$.

The monomer that provides the crosslinking site is preferably at least one selected from the group consisting of $CF_2\!=\!CFOCF_2CF(CF_3)OCF_2CF_2CN$, $CF_2\!=\!CFOCF_2CF(CF_3)OCF_2CF_2COOH$, $CF_2\!=\!CFOCF_2CF(CF_3)OCF_2CF_2CH_2I$, $CF_2\!=\!CFOCF_2CF_2CH_2I$, $CH_2\!=\!CFCF_2OCF(CF_3)CF_2OCF(CF_3)CN$, $CH_2\!=\!CFCF_2OCF(CF_3)CF_2OCF(CF_3)COOH$, $CH_2\!=\!CFCF_2OCF(CF_3)CF_2OCF(CF_3)CH_2OH$, $CH_2\!=\!CHCF_2CF_2I$, $CH_2\!=\!CH(CF_2)_2CH\!=\!CH_2$, $CH_2\!=\!CH(CF_2)_6CH\!=\!CH_2$, and $CF_2\!=\!CFO(CF_2)_5CN_2$, and more preferably at least one selected from the group consisting of $CF_2\!=\!CFOCF_2CF(CF_3)OCF_2CF_2CN$ and $CF_2\!=\!CFOCF_2CF_2CH_2I$.

From the viewpoint of excellent resistance to compression set at high temperature, the fluorine-containing elastomer has a glass transition temperature of preferably −70° C. or higher, more preferably −60° C. or higher, and further preferably −50° C. or higher. Further, from the viewpoint of good cold resistance, the fluorine-containing elastomer has a glass transition temperature of preferably 5° C. or lower, more preferably 0° C. or lower, and further preferably −3° C. or lower.

The glass transition temperature is determined as follows: using a differential scanning calorimeter (DSC822e, manufactured by Mettler Toledo), a DSC curve is obtained by heating 10 mg of a sample at 10° C./min; and the temperature is read at the intermediate point of two intersections between each of the extension lines of the baselines before and after the secondary transition of the DSC curve and the tangent line at the inflection point of the DSC curve.

From the viewpoint of good heat resistance, the fluorine-containing elastomer has a Mooney viscosity ML (1+20) at 170° C. of preferably 30 or more, more preferably 40 or more, and further preferably 50 or more. Further, from the viewpoint of good processibility, the fluorine-containing elastomer has a Mooney viscosity ML of preferably 150 or less, more preferably 120 or less, and further preferably 110 or less.

From the viewpoint of good heat resistance, the fluorine-containing elastomer has a Mooney viscosity ML (1+20) at 140° C. of preferably 30 or more, more preferably 40 or more, and further preferably 50 or more. Further, from the viewpoint of good processability, the fluorine-containing elastomer has a Mooney viscosity ML of preferably 180 or less, more preferably 150 or less, and further preferably 110 or less.

From the viewpoint of good heat resistance, the fluorine-containing elastomer has a Mooney viscosity ML (1+10) at 100° C. of preferably 10 or more, more preferably 20 or more, and further preferably 30 or more. Further, from the viewpoint of good processability, the fluorine-containing elastomer has a Mooney viscosity ML of preferably 120 or less, more preferably 100 or less, and further preferably 80 or less.

The Mooney viscosity can be measured at 170° C., 140° C., or 100° C. according to JIS K6300 by using a Mooney viscometer MV2000E manufactured by ALPHA TECHNOLOGIES.

The above-described partially fluorinated elastomer and perfluoroelastomer can be produced by a conventional method. However, from the viewpoint of a narrow molecular weight distribution of the obtained polymer, easy control of the molecular weight, and being able to introduce an iodine atom or a bromine atom to a terminal, an iodine compound or a bromine compound can also be used as a chain transfer agent. Examples of a polymerization method performed using an iodine compound or a bromine compound include a method in which emulsion polymerization is carried out in an aqueous medium under pressure in the presence of the iodine compound or the bromine compound in a substantially oxygen-free state (iodine transfer polymerization method). Typical examples of the iodine compound or bromine compound to be used include, for example, a compound represented by the formula:

$$R^{11}I_xBr_y$$

wherein x and y are each an integer of 0 to 2 and satisfy $1 \leq x+y \leq 2$; and $R^{11}$ is a saturated or unsaturated fluorohydrocarbon group or chlorofluorocarbon group having 1 to 16 carbon atoms or a hydrocarbon group having 1 to 3 carbon atoms, which may contain an oxygen atom. By using an iodine compound or a bromine compound, an iodine atom or a bromine atom is introduced into the polymer to function as a cross-linking point.

Examples of the iodine compound and the bromine compound include 1,3-diiodoperfluoropropane, 2-iodoperfluoropropane, 1,3-diiodo-2-chloroperfluoropropane, 1,4-diiodoperfluorobutane, 1,5-diode-2,4-dichloroperfluoropentane, 1,6-diiodoperfluorohexane, 1,8-diiodoperfluorooctane, 1,12-diiodoperfluorododecane, 1,16-diiodineperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, a monoiodomonobromo-substituted benzene, a diiodomonobromo-substituted benzene, and a (2-iodoethyl)-substituted benzene and a (2-bromoethyl)-substituted benzene, and the like. These compounds can be used alone or in combination together.

Among these, it is preferable to use 1,4-diiodoperfluorobutane, 1,6-diiodoperfluorohexane, or 2-iodoperfluoropropane from the viewpoint of polymerization reactivity, cross-linking reactivity, availability, and the like.

The fluorine-containing polymer is preferably a fluorine-containing elastomer having a cyano group (—CN group) at a terminal of a main chain and/or in a side chain. In a fluorine-containing elastomer having a cyano group (—CN group) at a terminal of the main chain and/or in a side chain, the cyano group can form a triazine ring by cyclization trimerization to enable crosslinking, thereby enabling the molded article to have superior resistance to compression set and heat resistance.

Examples of the fluorine-containing elastomer having a cyano group (—CN group) at a terminal of the main chain and/or in a side chain include a perfluoroelastomer and a partially fluorinated elastomer.

Examples of the perfluoroelastomer having a cyano group (—CN group) at a terminal of the main chain and/or in a side chain include, copolymers in which the monomer that provides a crosslinking site is a monomer having a cyano group (—CN group) among the above-described copolymers of TFE/fluoromonomer represented by formula (3), (4), or (5)/monomer that provides a crosslinking site. In this case, the content of the monomer unit having a cyano group (—CN group) may be 0.1 to 5 mol % with respect to the total amount of the TFE unit and the fluoromonomer unit represented by formula (3), (4), or (5), from the viewpoint of good crosslinking characteristics and heat resistance, and may even be 0.3 to 3 mol %. Even more preferable compositional features are as described above.

Further, examples of the monomer having a cyano group (—CN group) include monomers represented by the following formulas:

$$CY^1_2 = CY^1(CF_2)_n-CN \quad \text{Formula:}$$

wherein each $Y^1$ is the same or different and is a hydrogen atom or a fluorine atom, and n is an integer of 1 to 8;

$$CF_2 = CFCF_2Rf_8-CN \quad \text{Formula:}$$

wherein $Rf^8$ is $-(OCF_2)_n-$ or $-(OCF(CF_3))_n-$, and n is an integer of 0 to 5;

$$CF_2 = CFCF_2(OCF(CF_3)CF_2)_m(OCH_2CF_2CF_2)_nOCH_2CF_2-CN \quad \text{Formula:}$$

wherein m is an integer of 0 to 5, and n is an integer of 0 to 5;

$$CF_2 = CFCF_2(OCH_2CF_2CF_2)_m(OCF(CF_3)CF_2)_nOCF(CF_3)-CN \quad \text{Formula:}$$

wherein m is an integer of 0 to 5, and n is an integer of 0 to 5;

$$CF_2 = CF(OCF_2CF(CF_3))_mO(CF_2)_n-CN \quad \text{Formula:}$$

wherein m is an integer of 0 to 5, and n is an integer of 1 to 8;

$$CF_2 = CF(OCF_2CF(CF_3))_m-CN \quad \text{Formula:}$$

wherein m is an integer of 1 to 5;

$$CF_2 = CFOCF_2(CF(CF_3)OCF_2)_nCF(-CN)CF_3 \quad \text{Formula:}$$

wherein n is an integer of 1 to 4;

$$CF_2 = CFO(CF_2)_nOCF(CF_3)-CN \quad \text{Formula:}$$

wherein n is an integer of 2 to 5;

$$CF_2 = CFO(CF_2)_n-(C_6H_4)-CN \quad \text{Formula:}$$

wherein n is an integer of 1 to 6;

$$CF_2 = CF(OCF_2CF(CF_3))_nOCF_2CF(CF_3)-CN \quad \text{Formula:}$$

wherein n is an integer of 1 to 2;

$$CH_2 = CFCF_2O(CF(CF_3)CF_2O)_nCF(CF_3)-CN \quad \text{Formula:}$$

wherein n is an integer of 0 to 5;

$$CF_2 = CFO(CF_2CF(CF_3)O)_m(CF_2)_n-CN \quad \text{Formula:}$$

wherein m is an integer of 0 to 5, and n is an integer of 1 to 3;

$$CH_2 = CFCF_2OCF(CF_3)OCF(CF_3)-CN; \quad \text{Formula:}$$

$$CH_2 = CFCF_2OCH_2CF_2-CN; \quad \text{Formula:}$$

$$CF_2 = CFO(CF_2CF(CF_3)O)_mCF_2CF(CF_3)-CN \quad \text{Formula:}$$

wherein m is an integer of 0 or more;

$$CF_2 = CFOCF(CF_3)CF_2O(CF_2)_n-CN \quad \text{Formula:}$$

wherein n is an integer of 1 or more; and $$CF_2 = CFOCF_2OCF_2CF(CF_3)OCF_2-CN. \quad \text{Formula:}$$

These monomers can be used alone or in any combination.

Among the above, a monomer represented by the formula:

$$CF_2 = CF(OCF_2CF(CF_3))_mO(CF_2)_n-CN$$

wherein m is an integer of 0 to 5, n is an integer of 1 to 8; and $CF_2 = CFOCF_2CF(CF_3)OCF_2CF_2CN$ is more preferable.

Since these monomers have a cyano group, the cyano group undergoes a cyclization trimerization reaction, whereby triazine crosslinking proceeds.

These perfluoroelastomers can be produced by a conventional method.

Specific examples of the perfluoroelastomer may include the fluoroelastomers described in International Publication No. WO 97/24381, Japanese Patent Publication No. 61-57324, Japanese Patent Publication No. 4-81608, Japanese Patent Publication No. 5-13961, and the like.

Examples of the partially fluorinated elastomer having a cyano group (—CN group) at a terminal of the main chain and/or in a side chain include vinylidene fluoride (VdF)-based fluoroelastomers, tetrafluoroethylene (TFE)/propylene-based fluoroelastomers, tetrafluoroethylene (TFE)/propylene/vinylidene fluoride (VdF)-based fluoroelastomers, ethylene/hexafluoroethylene (HFP)-based fluoroelastomers, ethylene/hexafluoropropylene (HFP)/vinylidene fluoride (VdF)-based fluoroelastomers, ethylene/hexafluoropropylene (HFP)/tetrafluoroethylene (TFE)-based fluoroelastomers, fluorinesilicone-based fluoroelastomers, fluorophosphazene fluoroelastomers, and the like. These can each be used alone, or in any combination as long as the effects of the present disclosure are not impaired.

The vinylidene fluoride-based fluoroelastomer is a fluorine-containing copolymer comprising 45 to 85 mol % of vinylidene fluoride and 55 to 15 mol % of at least one other monomer copolymerizable with vinylidene fluoride. Preferably, the vinylidene fluoride-based fluoroelastomer is a fluorine-containing copolymer comprising 50 to 80 mol % of vinylidene fluoride and 50 to 20 mol % of at least one other monomer copolymerizable with vinylidene fluoride.

Examples of the at least one other monomer copolymerizable with vinylidene fluoride include a fluoromonomer such as TFE, CTFE, trifluoroethylene, HFP, trifluoropropylene, tetrafluoropropylene, pentafluoropropylene, trifluorobutene, tetrafluoroisobutene, perfluoro(alkyl vinyl ether) (PAVE), and vinyl fluoride, and non-fluorinated monomers such as ethylene, propylene and alkyl vinyl ether. These can be used alone or in any combination. Among these, TFE, HFP, and perfluoro(alkyl vinyl ether) are preferable.

Specific examples of the rubber include VdF-HFP-based rubber, VdF-HFP-TFE-based rubber, VdF-CTFE-based rubber, VdF-CTFE-TFE-based rubber, and the like.

The tetrafluoroethylene/propylene-based fluoroelastomer is a fluorine-containing copolymer comprising 45 to 70 mol % of tetrafluoroethylene and 55 to 30 mol % of propylene, and containing 0 to 5 mol % of a monomer that provides a crosslinking site with respect to the total amount of tetrafluoroethylene and propylene.

Examples of the monomer that provides a crosslinking site include a cyano group-containing monomer as described in Japanese Translation of PCT International Application Publication No. 4-505345 and Japanese Translation of PCT International Application Publication No. 5-5000070, the above-described monomer having a cyano group (—CN group).

These partially fluorinated elastomers can be produced by a conventional method.

Further, as the fluorine-containing elastomer, a thermoplastic fluoroelastomer comprising an elastomeric fluorine-containing polymer chain segment and a non-elastomeric fluorine-containing polymer chain segment may be used.

The composition of the present disclosure further contains a composite particle comprising a polymer containing an acid group-containing monomer unit and an inorganic particle dispersed in the polymer. That is, in the composite particle, since the inorganic particle is covered by the polymer, the action of the inorganic particle on the crosslinking reaction is controlled. Therefore, the composition of the present disclosure has excellent scorch resistance.

The acid group-containing monomer providing the acid group-containing monomer unit is not particularly limited as long as it is a monomer having at least one ethylenically unsaturated bond and at least one acid group. However, in terms of being able to improve scorch resistance even further, at least one selected from the group consisting of an unsaturated carboxylic acid, an unsaturated sulfonic acid, an unsaturated phosphonic acid, and an unsaturated phosphoric acid is preferable, at least one selected from the group consisting of an unsaturated carboxylic acid and an unsaturated sulfonic acid is more preferable, and an unsaturated carboxylic acid is further preferable. The acid group-containing monomer may form a salt together with a cation such as an alkali metal ion, an alkaline earth metal ion, and an ammonium ion.

Examples of the unsaturated carboxylic acid include acrylic acid, methacrylic acid, vinyl acetic acid, crotonic acid, cinnamic acid, 3-allyloxypropionic acid, 3-(2-allyloxyethoxycarbonyl)propionic acid, itaconic acid, itaconic acid monoester, maleic acid, maleic acid monoester, fumaric acid, fumaric acid monoester, vinyl phthalate, vinyl pyromellitic acid, undecylene acid, 2-methacryloyloxyethyl succinic acid, 2-acryloyloxyethyl succinic acid, 2-methacryloyloxyethyl phthalic acid, 2-acryloyloxyethyl phthalic acid, 2-methacryloyloxyethyl hexahydrophthalic acid, 2-acryloyloxyethyl hexahydrophthalic acid, 2-acryloyloxypropyl phthalic acid, 2-acryloyloxypropyl hexahydrophthalic acid, 2-acryloyloxypropyl tetrahydrophthalic acid, methacryloxyethyl trimellitic acid, crotonic acid, N-acryloylalanine, maleic anhydride, citraconic anhydride, 4-vinylbenzoic acid, and the like.

Among these, the unsaturated carboxylic acids is preferably at least one selected from the group consisting of a compound represented by $$CR^{11}R^{12}=CR^{13}-R^{14}-(COOH)_n \quad \text{Formula (11):}$$

wherein $R^{11}$ to $R^{13}$ are the same or different, and are a hydrogen atom or a monovalent hydrocarbon group, $R^{14}$ is a divalent or trivalent linking group, and n is 1 or 2; and a compound represented by $$CR^{15}R^{16}=CR^{17}-R^{18}-Ar-(COOH)_m \quad \text{Formula (12):}$$

wherein $R^{15}$ to $R^{17}$ are the same or different, and are a hydrogen atom or a monovalent hydrocarbon group, $R^{18}$ is a divalent or trivalent linking group, Ar is a divalent or trivalent cyclic aliphatic group or aromatic group, and m is 1 or 2. A compound represented by formula (11) is more preferable.

$R^{11}$ to $R^{13}$ are preferably the same or different, and are a hydrogen atom, an alkyl group having 1 to 5 carbon atoms, or an aryl group. $R^{14}$ is preferably a single bond or a divalent linking group represented by $$-(C=O)_{n1}-(O)_{n2}-R^{141}- \quad \text{Formula:}$$

wherein n1 and n2 are the same or different, and are 0 or 1, and $R^{141}$ is an alkylene group in which an oxygen atom may be inserted between carbon-carbon atoms. The alkylene group of $R^{141}$ preferably has 1 to 10 carbon atoms, and more preferably 1 to 3 carbon atoms.

Further, n in formula (11) represents the number of carboxyl groups, which is 1 when $R^{14}$ is divalent and 2 when $R^{14}$ is trivalent. As $R^{14}$ and n in formula (11), $R^{14}$ is preferably a divalent linking group and n is preferably 1.

$R^{15}$ to $R^{17}$ are preferably the same or different, and are a hydrogen atom or an alkyl group having 1 to 5 carbon atoms. Rn is preferably a single bond or a divalent linking group represented by $$-(C=O)_{m1}-(O)_{m2}-R^{181}-(O)_{m3}-(C=O)_{m4}- \quad \text{Formula:}$$

wherein m1 to m4 are the same or different, and are 0 or 1, and $R^{181}$ is an alkylene group in which an oxygen atom may be inserted between carbon-carbon atoms.

The alkylene group of $R^{181}$ preferably has 1 to 10 carbon atoms, and more preferably 1 to 3 carbon atoms.

Further, m in formula (12) represents the number of carboxyl groups, which is 1 when Ar is divalent and 2 when Ar is trivalent. Ar preferably has 6 carbon atoms.

Examples of the unsaturated sulfonic acid include vinyl sulfonic acid, allylsulfonic acid, metharylsulfonic acid, 2-sulfoethyl acrylate, 2-ethyl sulfomethacrylate, 2-acrylamide-2-methylpropane sulfonic acid, styrene sulfonic acid, 3-allyloxy-2-hydroxypropanesulfonic acid, and the like.

Examples of the unsaturated phosphonic acid include vinylphosphonic acid, allylphosphonic acid, vinylbenzylphosphonic acid, 1-phenylethenylphosphonic acid, 2-phenylethenylphosphonic acid, 2-(acryloyloxy)ethylphosphonic acid, 2-(methacryloyloxy)ethylphosphonic acid, 3-(acryloyloxy) propylphosphonic acid, 3-(methacryloyloxy)propylphosphonic acid, and the like.

Examples of the unsaturated phosphoric acid include 2-(acryloyloxy)ethyl phosphate and 2-(methacryloyloxy) ethyl phosphate.

From the point that scorch resistance can be further improved, the acid group-containing monomer is preferably at least one selected from the group consisting of methacrylic acid and vinyl sulfonic acid, and methacrylic acid is more preferable.

The polymer may be a polymer comprising only the acid group-containing monomer unit, or may be a polymer containing the acid group-containing monomer unit and a monomer unit other than the acid group-containing monomer unit.

The polymer may further contain an unsaturated carboxylic acid ester unit. The unsaturated carboxylic acid ester that provides the unsaturated carboxylic acid ester unit is preferably an acrylic acid alkyl ester having an alkyl group having 1 to 10 carbon atoms or a methacrylic acid alkyl ester having an alkyl group having 1 to 10 carbon atoms. Examples of the (meth)acrylic acid ester include (meth)acrylic acid alkyl esters such as methyl acrylate, ethyl acrylate, n-propyl acrylate, isopropyl acrylate, n-butyl acrylate, methyl methacrylate, n-propyl methacrylate, ethyl methacrylate, n-butyl methacrylate, isopropyl methacrylate, 2-ethylhexyl acrylate, 2-ethylhexyl methacrylate, cyclohexyl acrylate, and cyclohexyl methacrylate. In the present disclosure, "(meth)acrylic acid ester" means an acrylic acid ester or a methacrylic acid ester.

The (meth)acrylic acid ester is preferably methyl methacrylate.

In the polymer contained in the composite particle, from the point that scorch resistance can be further improved, the content of the acid group-containing monomer unit is preferably 1 to 100 mol %, more preferably 10 to 100 mol %, and further preferably 25 to 100 mol % with respect to all the monomer units. In this case, the content of the other monomer units is 99 to 0 mol %, more preferably 90 to 0 mol %, and further preferably 75 to 0 mol %.

When the polymer further contains an unsaturated carboxylic acid ester unit, the content of the acid group-containing monomer unit is preferably 1 to 99 mol %, more preferably 10 to 90 mol %, and further preferably 25 to 75 mol % with respect to all the monomer units from the viewpoint of scorch resistance. Further, the content of the unsaturated carboxylic acid ester unit is preferably 99 to 1 mol %, more preferably 90 to 10 mol %, and further preferably 75 to 25 mol % with respect to the all the monomer units.

The polymer may further contain a styrene unit. When the polymer further contains a styrene unit, the content of the acid group-containing monomer units is preferably 1 to 99 mol %, and more preferably 10 to 90 mol % with respect to all the monomer units from the viewpoint of scorch resistance. In this case, the content of the styrene unit is preferably 99 to 1 mol %, and more preferably 90 to 10 mol % with respect to all the monomer units.

The polymer preferably has a number average molecular weight (weight average molecular weight, etc.) of 10,000 to 1,000,000. The molecular weight can be measured by a method using liquid chromatography or a precipitation method.

The inorganic particle is preferably an inorganic nitride particle. When the composition contains an inorganic nitride particle, the cyano group in the fluorine-containing elastomer undergoes a cyclization trimerization reaction, whereby triazine crosslinking reaction can be caused to proceed.

Examples of the inorganic particle include, but are not particularly limited to, inorganic nitride particles such as particles of silicon nitride ($Si_3N_4$), lithium nitride, titanium nitride, aluminum nitride, boron nitride, vanadium nitride, and zirconium nitride. Among these, a silicon nitride particle is preferable because nano-sized fine particles can be supplied and because a metal or the like, which is undesirable in a semiconductor fabrication process, is not included. Further, two or more of these inorganic nitride particles may be mixed and used together.

The average particle size of the above-described inorganic particle is preferably 1000 nm or less, more preferably 300 nm or less, and further preferably 100 nm or less. The lower limit is not particularly limited, but is preferably 5 nm.

The composite particle preferably contains 1 to 80% by mass of the inorganic particle. The content of the inorganic particle is more preferably 10% by mass or more, further preferably 20% by mass or more, particularly preferably 35% by mass or more, and most preferably 50% by mass or more, and is preferably 75% by mass or less, and more preferably 70% by mass or less. When the content of the inorganic particle is within the above range, scorch resistance can be further improved and the crosslinking reaction can be caused to progress thoroughly.

The average particle size of the composite particle is preferably 0.01 to 100 μm, more preferably 0.05 μm or more, and further preferably 0.1 μm or more, and is more preferably 30 μm or less, and further preferably 15 μm or less. When the average particle size of the composite particle is in the above range, handleability is excellent and the inorganic particle can be thoroughly dispersed in the composition. The average particle size is a median diameter obtained by a laser diffraction type particle size distribution measurement apparatus.

The composite particle is preferably obtained by polymerizing a monomer containing at least the acid group-containing monomer in a dispersion in which the inorganic particle is dispersed.

The above composite particle can be produced by a known method (for example, a method described in "Key points for Preparing Nano-Microcapsules", by Masato Tanaka, published by Techno System Publishing Co., Ltd., May 6, 2008).

Specifically, the composite particle can be produced by a production method comprising a step of dispersing an inorganic particle, a monomer containing at least the above-described acid group-containing monomer, a dispersant, and a polymerization initiator in a solvent to obtain a dispersion, a step of polymerizing the monomer in the dispersion to obtain a slurry, and a step of collecting the composite particle from the slurry.

In the polymerization described above, as the monomer, in addition to the acid group-containing monomer, another monomer that provides the other monomer unit constituting the above-described polymer, such as the above-described unsaturated carboxylic acid ester and styrene, can also be polymerized.

The mass ratio of the inorganic particle to the monomer (inorganic particle/monomer) is preferably 1/99 to 80/20, more preferably 10/90 or more, and more preferably 75/25 or less.

The dispersant is preferably at least one selected from the group consisting of polyvinylpyrrolidone, a saponified product of polyvinyl alcohol, and hydroxypropyl cellulose, and more preferably is polyvinylpyrrolidone.

The polymerization initiator is preferably at least one selected from the group consisting of an azo compound and a peroxide, and more preferably is an azo compound. Examples of the azo compound include 2,2'-azobis-2,4-dimethylvaleronitrile, 2,2'-azobisisobutyronitrile, 2,2'-azobis(2-methylpropionitrile), and the like.

The solvent is preferably at least one selected from the group consisting of water, alcohol, benzene, and toluene, and more preferably is at least one selected from the group consisting of water and alcohol. As the alcohol, an alcohol having 1 to 5 carbon atoms is preferable, and 1-butanol, methanol or ethanol is more preferable.

Known means, such as ultrasonic waves, may be used to disperse each of the components in the solvent.

The polymerization of the monomer can be started by heating the dispersion to a temperature that is equal to or higher than the decomposition temperature of the polymerization initiator. The decomposition temperature is usually 30 to 120° C. The polymerization time is usually 1 to 24 hours.

When the polymerization is complete, a slurry containing the composite particle and the solvent is produced. Methods for collecting the composite particle from the slurry are known. After collection, the composite particle may be dried if necessary.

The content of the composite particle in the composition of the present disclosure is preferably 0.1 to 30 parts by mass, more preferably 0.3 parts by mass or more, and further preferably 0.5 parts by mass or more, and is more preferably 10 parts by mass or less, and further preferably 5 parts by mass or less. When the content of the composite particle is within the above range, scorch resistance can be further improved and the crosslinking reaction can be caused to progress thoroughly.

The cross-linking agent is not an essential component. However, the composition may further contain a cross-linking agent. Examples of the cross-linking agent include cross-linking agents used in peroxide crosslinking, polyol crosslinking, polyamine crosslinking, triazine crosslinking, oxazole crosslinking, imidazole crosslinking, and thiazole crosslinking. When the fluorine-containing polymer is a fluorine-containing elastomer having a cyano group (—CN group) at a terminal of a main chain and/or in a side chain, the cross-linking agent is preferably at least one selected from the group consisting of an oxazole cross-linking agent, an imidazole cross-linking agent, and a thiazole cross-linking agent.

The cross-linking agent used for peroxide crosslinking may be any organic peroxide that can easily generate a peroxy radical in the presence of heat or a redox system. Specific examples include 1,1-bis(t-butylperoxy)-3,5,5-trimethylcyclohexane, 2,5-dimethylhexane-2,5-dihydroperoxide, di-t-butylperoxide, t-butylcumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)-hexyne-3, benzoyl peroxide, t-butylperoxybenzene, 2,5-dimethyl-2,5-di(benzoylperoxy)hexane, t-butylperoxymaleic acid, t-butylperoxy isopropyl carbonate, 1,3-bis(t-butylperoxy isopropyl)benzene, and the like. Generally, the type and amount of the organic peroxide to be used are selected in consideration of the amount of active —O—O—, decomposition temperature, and the like.

Further, the crosslinking aid that can be used in this case may be a compound having a reactivity with a peroxy radical and a polymer radical. Examples thereof include polyfunctional compounds having a functional group such as —CH=CH$_2$, —CH$_2$CH=CH$_2$, —CF=CF$_2$, —C(CF$_3$)=CF$_2$, —C(CH$_3$)=CF$_2$, —CF=CF(CF$_3$), —CF=CF(CH$_3$), —C(C$_6$H$_5$)=CF$_2$, —CF=CF(C$_6$H$_5$), —CH=CF$_2$, —CF=CHF, —C(CF$_3$)=CHF, —CF=CH(CF$_3$), —CH=CF(CF$_3$) and the like wherein "C$_6$H$_5$" represents a phenyl radical. Specific examples thereof include triallyl cyanurate, triallyl isocyanurate (TAIC), triacryl formal, triallyl trimerite, N,N'-n-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine 2,4,6-trione), tris(diallylamine)-S-triazine, triallyl phosphite, N,N-diallylacrylamide, 1,6-divinyldodecafluorohexane, and the like.

Examples of the cross-linking agent, or crosslinking aid used together with the cross-linking agent used in peroxide cross-linking include compounds having at least one structure represented by formula (21):

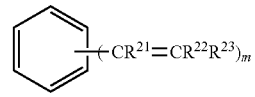

wherein R$^{21}$ to R$^{23}$ are independently a hydrogen atom, a fluorine atom, an alkyl group, a fluorinated alkyl group, or a substituted or unsubstituted aryl group, and at least one of R$^{21}$ to R$^{23}$ is a fluorine atom or a group containing a fluorine atom; m is an integer of 1 to 5; when m is 2 or more, m-number of R$^{21}$ to R$^{23}$ may be the same or different with each other; the hydrogen atoms of the benzene ring may be substituted. When m is 1, it is preferable to have two or more of the structures.

Examples of the compound having a structure represented by formula (11) include compounds represented by formula (22):

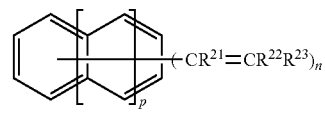

wherein R$^{21}$ to R$^{23}$ are as defined above; p is an integer of 0 to 2; and n is an integer of 2 to 6, compounds represented by formula (23):

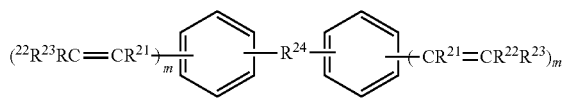

wherein $R^{21}$ to $R^{23}$ are as defined above, $R^{24}$ is a single bond, —SO$_2$—, —O—, —S—, —CO—, a heteroatom-containing group, a substituted or unsubstituted alkylene group, a substituted or unsubstituted cycloalkylene group, a substituted or unsubstituted cycloalkylene group or a substituted or unsubstituted arylene group, m is an integer of 1 to 5; and the like.

Examples of the cross-linking agent used for polyol crosslinking include polyhydric alcohol compounds such as bisphenol A and bisphenol AF.

Examples of the cross-linking agent used for polyamine crosslinking include polyamine compounds such as hexamethylenediamine carbamate, N,N'-dicinenamiridene-1,6-hexanediamine, and 4,4'-bis(aminocyclohexyl)methane carbamate.

Examples of the cross-linking agent used for triazine crosslinking include organic tin compounds such as tetraphenyltin and triphenyltin.

Examples of the cross-linking agents used for oxazole crosslinking, imidazole crosslinking, and thiazole crosslinking include a bisdiaminophenyl-based cross-linking agent, a bis-aminophenol-based cross-linking agent, and a bis-aminothiophenol-based cross-linking agent represented by formula (30):

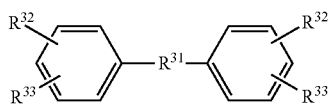

wherein $R^{31}$ is —SO$_2$—, —O—, —CO—, an alkylene group having 1 to 6 carbon atoms, a perfluoroalkylene group having 1 to 10 carbon atoms, a single bond, or a group represented by:

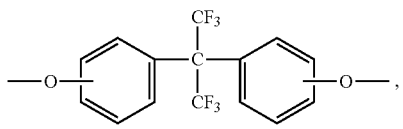

one of $R^{32}$ and $R^{33}$ is —NH$_2$ and the other is —NHR$^{34}$, —NH$_2$, —OH, or —SH, $R^{34}$ is a hydrogen atom, a fluorine atom, or a monovalent organic group, preferably $R^{32}$ is —NH$_2$ and $R^{33}$ is —NHR$^{34}$; preferred specific examples of the alkylene group having 1 to 6 carbon atoms include a methylene group, an ethylene group, a propylene group, a butylene group, a pentylene group, a hexylene group, and the like, and examples of the perfluoroalkylene group having 1 to 10 carbon atoms include:

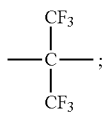

these compounds are known as examples of bisdiaminophenyl compounds in Japanese Patent Publication No. 2-59177, Japanese Patent Laid-Open No. 8-120146, and the like;

a bisamidrazone-based cross-linking agent represented by formula (31):

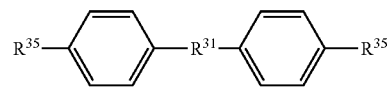

wherein $R^{31}$ is as defined above, and $R^{35}$ are independently any one of the following groups:

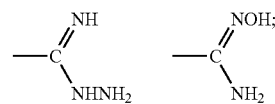

a bisamidrazone-based compound represented by formula (32):

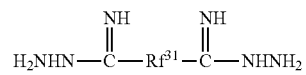

wherein Rf$^{31}$ is a perfluoroalkylene group having 1 to 10 carbon atoms; and a bisamidoxime-based cross-linking agent represented by formula (33):

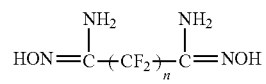

wherein n is an integer of 1 to 10. These bisaminophenol-based cross-linking agents, bisaminothiophenol-based cross-linking agents, bisdiaminophenyl-based cross-linking agents, and the like have conventionally been used in crosslinking systems that use a cyano group as a crosslinking point, but these agents also react with a carboxyl group and an alkoxycarbonyl group to form an oxazole ring, a thiazole ring, and an imidazole ring to provide a crosslinked product.

Examples of a particularly preferable cross-linking agent include a compound having a plurality of 3-amino-4-hydroxyphenyl groups or 3-amino-4-mercaptophenyl groups, or a compound represented by formula (34):

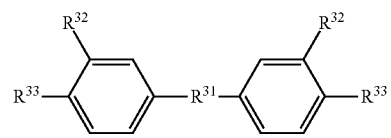

wherein $R^{31}$, $R^{32}$, and $R^{33}$ are as defined above. Specifically, examples include 2,2-bis(3-amino-4-hydroxyphenyl) hexafluoropropane (generic name: bis(aminophenol)AF), 2,2-bis(3-amino-4-mercaptophenyl) hexafluoropropane, tetraaminobenzene, bis-3,4-diaminophenylmethane, bis-3,4-diaminophenyl ether, 2,2-bis(3,4-diaminophenyl)hexafluoropropane, 2,2-bis[3-amino-4-(N-phenylamino)phenyl]hexafluoropropane, 2,2-bis[3-amino-4-(N-methylamino)phenyl] hexafluoropropane, 2,2-bis[3-amino-4-(N-ethylamino) phenyl]hexafluoropropane, 2,2-bis[3-amino-4-(N-propylamino)phenyl]hexafluoropropane, 2,2-bis[3-amino-4-(N-perfluorophenylamino)phenyl]

hexafluoropropane, 2,2-bis[3-amino-4-(N-benzylamino)phenyl]hexafluoropropane, and the like.

Among these, the cross-linking agent is preferably 2,2-bis[3-amino-4-(N-phenylamino)phenyl]hexafluoropropane, from the point of heat resistance, steam resistance, amine resistance, and good crosslinkability.

The content of the cross-linking agent is preferably 0.05 to 10 parts by mass, and more preferably 0.5 to 5 parts by mass with respect to 100 parts by mass of the fluorine-containing polymer.

The above-described composition may contain a general filler.

Examples of the general filler include an imide-based filler having an imide structure such as polyimide, polyamideimide, and polyetherimide, an organic filler made of engineering plastic such as polyarylate, polysulfone, polyethersulfone, polyphenylene sulfide, polyether ether ketone, polyether ketone, and polyoxybenzoate, a metal oxide filler such as aluminum oxide, silicon oxide, and yttrium oxide, a metal carbide such as silicon carbide and aluminum carbide, a metal nitride filler such as silicon nitride and aluminum nitride, an inorganic filler such as aluminum fluoride, carbon fluoride, barium sulfate, carbon black, silica, clay, and talc, and the like.

Among these, carbon black, aluminum oxide, yttrium oxide, silicon oxide, polyimide, and carbon fluoride are preferable from the viewpoint of a shield effect against various plasmas.

Further, the inorganic filler and organic filler may be used alone or blended in a combination of two or more thereof.

The amount of the general filler to be blended is preferably 0.5 to 100 parts by mass, and more preferably 5 to 50 parts by mass with respect to 100 parts by mass of the fluorine-containing polymer.

Especially in fields not requiring high purity and non-contamination properties, an ordinary additive that is blended in the fluorine-containing polymer composition, such as a filler, a processing aid, a plasticizer, and a colorant, can optionally be blended. One or more common cross-linking agents and cross-linking aids different from those described above may also be blended.

An example of a particularly preferred embodiment of the composition of the present disclosure is as follows: the composition comprising a composite particle and a fluorine-containing elastomer having a cyano group (—CN group) at a terminal of a main chain and/or in a side chain, wherein the composite particle comprises a polymer and an inorganic nitride particle dispersed in the polymer, the polymer contains the above-described acid group-containing monomer unit, and the composition comprises 0.1 to 30 parts by mass of the composite particle per 100 parts by mass of the fluorine-containing elastomer. As the fluorine-containing elastomer, a perfluoroelastomer is preferable. Further, as the inorganic nitride particle, a silicon nitride particle is preferable. Still further, as the acid group-containing monomer unit, the above-described unsaturated carboxylic acid unit is preferable.

The composition can be suitably used as a molding material for obtaining a molded article by molding and crosslinking.

The composition can be produced by a production method comprising a step of dispersing an inorganic particle, a monomer containing at least the above-described acid group-containing monomer, a dispersant, and a polymerization initiator in a solvent to obtain a dispersion, a step of polymerizing the monomer in the dispersion to obtain a slurry, a step of collecting composite particle from the slurry, and a step of kneading the composite particle and the fluorine-containing polymer.

The kneading can be carried out using a normal polymer processing machine, for example, an open roll, a Banbury mixer, a kneader, a closed mixer, and the like.

The method for obtaining a preform by using the composition as a molding material may be an ordinary method, and can be performed by a known method such as a method of heating and compressing in a mold, a method of press-fitting into a heated mold, and a method of extruding with an extruder. In the case of an extruded product such as a hose and an electric wire, the molded article can be obtained by heating and crosslinking with steam or the like after extrusion.

The method for obtaining the molded article from the above-described composition may be an ordinary method. The molded article can be obtained by, after obtaining the preform, performing, in order, primary crosslinking and finally secondary crosslinking.

The primary crosslinking is preferably carried out at 150 to 200° C. for 5 to 120 minutes, and more preferably at 170 to 190° C. for 5 to 60 minutes. As the crosslinking means, known crosslinking means may be used, and examples thereof include press-crosslinking.

The secondary crosslinking is preferably carried out at 180 to 320° C. for 2 to 24 hours, and more preferably at 190 to 310° C. for 5 to 20 hours. Further, the secondary crosslinking may be carried out at 250 to 320° C. for 2 to 24 hours, or at 280 to 310° C. for 5 to 20 hours. As the crosslinking means, known crosslinking means may be used, and examples thereof include oven crosslinking.

The molded article of the present disclosure can be obtained from the above-described composition.

The molded article of the present disclosure can be suitably used as a sealing material for a semiconductor fabrication apparatus that particularly requires heat resistance, particularly a semiconductor fabrication apparatus in which high-density plasma irradiation is performed. Examples of the sealing material include O-rings, square-rings, gasket, packing, oil seals, bearing seals, lip seals, and the like.

In addition, the molded article of the present disclosure can also be used as various polymer products used in semiconductor fabrication apparatus, such as diaphragms, tubes, hoses, various rubber rolls, and belts. Further, the molded article of the present disclosure can also be used as a coating material and a lining material.

As referred to herein, the "semiconductor fabrication apparatus" is not particularly limited to an apparatus for fabricating semiconductors, and widely includes general fabrication apparatus used in the semiconductor field requiring a high level of cleanliness, such as apparatus for manufacturing liquid crystal panels and plasma panels. Examples thereof include the following.

(1) Etching apparatus
  Dry etching apparatus
  Plasma etching apparatus
  Reactive ion etching apparatus
  Reactive ion beam etching apparatus
  Sputter etching apparatus
  Ion beam etching apparatus
  Wet etching apparatus
  Ashing apparatus (2) Cleaning apparatus
   Dry etching cleaning apparatus
   UV/O₃ cleaning apparatus
   Ion beam cleaning apparatus
   Laser beam cleaning apparatus
   Plasma cleaning apparatus
   Gas etching cleaning apparatus
   Extraction and cleaning apparatus
   Soxhlet extraction cleaning apparatus
   High-temperature high-pressure extraction cleaning apparatus
   Microwave extraction cleaning apparatus
   Supercritical extraction cleaning apparatus
(3) Exposure apparatus
   Stepper
   Coater/developer
(4) Polishing apparatus
   CMP apparatus
(5) Film formation apparatus
   CVD apparatus
   Sputtering apparatus
(6) Diffusion/ion implantation apparatus
   Oxidation diffusion apparatus
   Ion implantation apparatus The molded article of the present disclosure exhibits excellent performance as a sealing material for, for example, a CVD apparatus, a plasma etching apparatus, a reactive ion etching apparatus, an ashing apparatus, and an excimer laser exposure machine.

Embodiments have been described above, but it will be understood that various modifications to the modes and details may be made without departing from the spirit and scope of the claims.

EXAMPLES

Next, embodiments of the present disclosure will be described with reference to Examples, but the present disclosure is not limited to only these Examples.

Preparation Examples 1 to 6

A separable flask with a volume of 1000 ml was used as the reaction vessel. 15 g of polyvinylpyrrolidone and the monomers shown in Table 1 were dissolved in 790 ml of 1-butanol in the reaction vessel, 40 g of silicon nitride particles (average particle size 30 nm) were further added, and the mixture was dispersed by a homogenizer at 5,000 rpm for 5 minutes.

After dissolving 2.0 g of 2,2'-azobis(2-methylpropionitrile) as a polymerization initiator while stirring using a 6-blade inclined paddle, the temperature was raised to 70° C. and the mixture was dispersed for 15 hours to perform polymerization.

After completion of the dispersion polymerization, the composite particles were separated from the obtained slurry by a vacuum filtration apparatus, and then dried for 15 hours in a dryer set to 75° C. Then, the composite particles were heated at 100° C. for 2 hours in an inert gas. The obtained composite particles had a structure in which a silicon nitride particle was dispersed in the polymer.

The obtained composite particles were evaluated by the following methods.

50% Diameter of Composite Particles (Median Diameter)

The 50% diameter of the composite particles was measured by a laser diffraction type particle size distribution measurement apparatus "HELOS & RODOS", manufactured by Sympatec. The results are shown in Table 1.

Silicon Nitride Ratio in Composite Particles

The silicon nitride ratio in the composite particles was calculated by measuring the change in mass under conditions of air 200 ml/min, temperature-increasing rate 10° C./min, and temperature range 20 to 600° C. using a thermogravimetric meter (TG-DTA 7200, manufactured by SII NanoTechnology Inc.), and determining the remaining ratio at the temperature raised to 600° C. The results are shown in Table 1.

TABLE 1

| | Monomer Amount Added | | 50% | Silicon |
| | Methyl Methacrylate | Methacrylic Acid | Diameter (μm) | Nitride Ratio (wt %) |
| --- | --- | --- | --- | --- |
| Preparation Example 1 | 38.8 ml | 3.5 ml | 14.0 | 62 |
| Preparation Example 2 | 31.1 ml | 10.7 ml | 8.2 | 58 |
| Preparation Example 3 | 21.6 ml | 17.3 ml | 10.0 | 60 |
| Preparation Example 4 | 13.0 ml | 24.2 ml | 11.2 | 62 |
| Preparation Example 5 | 0 ml | 34.5 ml | 9.5 | 60 |
| Preparation Example 6 | 43.2 ml | 0 ml | 10.5 | 57 |

Example 1

A mixture of 0.5 parts by mass of the composite particle obtained in Preparation Example 1, 0.8 parts by mass of 4,4'-[2,2,2-trifluoro-1-(trifluoromethyl)ethylidene]bis[N1-phenyl-1,2-benzenediamine] as a cross-linking agent, and 23 parts by mass of carbon black (average particle size 0.3 μm) as a filler with respect to 100 parts by mass of a fluorine-containing elastomer (TFE/PMVE/cyano group-containing monomer=59.4/40.1/0.5 (molar ratio)) was kneaded with an open roll to prepare a crosslinkable fluoroelastomer composition.

The obtained fluoroelastomer composition was placed in an alumina bag, vacuum-packed, and then stored at 40° C. for the storage period shown in Table 2. The vulcanization characteristics were measured under the condition of 180° C./30 minutes using a moving dialeometer MDR 2000 manufactured by Alpha Technologies, and the storage stability was evaluated from the change in ML. ML is the minimum torque value, and this numerical value is an index of fluidity during vulcanization molding. As the numerical value becomes smaller, the fluidity becomes better. This numerical value increases as scorching progresses due to the crosslinking reaction. The results are shown in Table 2.

The obtained fluoroelastomer composition was crosslinked by pressing at 180° C. for 30 minutes, then oven crosslinked in an oven at 200° C. for 12 hours, 250° C. for 3 hours, and 290° C. for 3 hours to produce a 2 mm-thick test sample of a crosslinked product. The normal physical properties of the obtained test sample were measured by the following method.

Normal Physical Properties

The 100% tensile stress (MPa), tensile strength (MPa), elongation (%), and hardness Peak (Shore A) in a normal state (25° C.) of the 2 mm-thick test sample were measured according to JIS K6251. The results are shown in Table 3.

Example 2

A fluoroelastomer composition was prepared in the same manner as in Example 1, except that the composite particle was changed to that obtained in Preparation Example 2. Using the obtained fluoroelastomer composition, the storage stability was evaluated in the same manner as in Example 1. The results are shown in Table 2. Further, a 2 mm-thick test sample of a crosslinked product was prepared in the same manner as in Example 1. The normal physical properties of the obtained test sample were measured in the same manner as in Example 1. The results are shown in Table 3.

Example 3

A fluoroelastomer composition was prepared in the same manner as in Example 1, except that the composite particle was changed to that obtained in Preparation Example 3. Using the obtained fluoroelastomer composition, the storage stability was evaluated in the same manner as in Example 1. The results are shown in Table 2. Further, a 2 mm-thick test sample of a crosslinked product was prepared in the same manner as in Example 1. The normal physical properties of the obtained test sample were measured in the same manner as in Example 1. The results are shown in Table 3.

Example 4

A fluoroelastomer composition was prepared in the same manner as in Example 1, except that the composite particle was changed to that obtained in Preparation Example 4. Using the obtained fluoroelastomer composition, the storage stability was evaluated in the same manner as in Example 1. The results are shown in Table 2. Further, a 2 mm-thick test sample of a crosslinked product was prepared in the same manner as in Example 1. The normal physical properties of the obtained test sample were measured in the same manner as in Example 1. The results are shown in Table 3.

Example 5

A fluoroelastomer composition was prepared in the same manner as in Example 1, except that the composite particle was changed to that obtained in Preparation Example 5. Using the obtained fluoroelastomer composition, the storage stability was evaluated in the same manner as in Example 1. The results are shown in Table 2. Further, a 2 mm-thick test sample of a crosslinked product was prepared in the same manner as in Example 1. The normal physical properties of the obtained test sample were measured in the same manner as in Example 1. The results are shown in Table 3.

Comparative Example 1

A fluoroelastomer composition was prepared in the same manner as in Example 1, except that the composite particle was changed to that obtained in Preparation Example 6. Using the obtained fluoroelastomer composition, the storage stability was evaluated in the same manner as in Example 1. The results are shown in Table 2. Further, a 2 mm-thick test sample of a crosslinked product was prepared in the same manner as in Example 1. The normal physical properties of the obtained test sample were measured in the same manner as in Example 1. The results are shown in Table 3.

Reference Example 1

A fluoroelastomer composition was prepared in the same manner as in Example 1, except that a composite particle was not used, and 0.25 parts by mass of silicon nitride (average particle size 30 nm), 0.8 parts by mass of a cross-linking agent 4,4'-[2,2,2-trifluoro-1-(trifluoromethyl)ethylidene]bis[N1-phenyl-1,2-benzenediamine], and 23 parts by mass of carbon black (average particle size 0.3 μm) as a filler with respect to 100 parts by mass of fluorine-containing elastomer (TFE/PMVE/cyano group-containing monomer=59.4/40.1/0.5 (molar ratio)) were blended. Using the obtained fluoroelastomer composition, a 2 mm-thick test sample of a crosslinked product was prepared in the same manner as in Example 1. The normal physical properties of the obtained test sample were measured in the same manner as in Example 1. The results are shown in Table 3.

[Table 2]

TABLE 2

| | Storage Period (days) | ML (dNm) | Change in ML (dNm) |
|---|---|---|---|
| Example 1 | 0 | 4.10 | — |
| | 1 | 4.38 | 0.28 |
| | 2 | 5.01 | 0.91 |
| | 3 | 5.21 | 1.11 |
| | 6 | 5.23 | 1.13 |
| | 9 | 6.02 | 1.92 |
| Example 2 | 0 | 4.13 | — |
| | 1 | 4.13 | 0.00 |
| | 2 | 4.74 | 0.61 |
| | 3 | 4.81 | 0.68 |
| | 6 | 5.06 | 0.93 |
| | 9 | 5.39 | 1.26 |
| Example 3 | 0 | 3.89 | — |
| | 1 | 3.89 | 0.00 |
| | 2 | 3.90 | 0.01 |
| | 3 | 4.29 | 0.40 |
| | 6 | 4.51 | 0.62 |
| | 9 | 4.72 | 0.83 |
| Example 4 | 0 | 4.04 | — |
| | 1 | 4.13 | 0.09 |
| | 2 | 4.40 | 0.36 |
| | 3 | 4.44 | 0.40 |
| | 6 | 4.97 | 0.93 |
| | 9 | 5.16 | 1.12 |
| Example 5 | 0 | 3.96 | — |
| | 1 | 4.09 | 0.13 |
| | 2 | 4.40 | 0.44 |
| | 3 | 4.90 | 0.94 |
| | 6 | 5.10 | 1.14 |
| | 9 | 5.42 | 1.46 |
| Comparative Example 1 | 0 | 3.96 | — |
| | 1 | 5.10 | 1.14 |
| | 2 | 5.43 | 1.47 |
| | 3 | 5.44 | 1.48 |
| | 6 | 5.68 | 1.72 |
| | 9 | 7.27 | 3.31 |

TABLE 3

| Item | Example 1 | Example 2 | Example 3 | Example 4 | Example 5 | Comparative Example 1 | Reference Example 1 |
|---|---|---|---|---|---|---|---|
| 100% Tensile Stress (MPa) | 8.4 | 8.5 | 9.0 | 7.9 | 8.2 | 8.9 | 8.0 |

TABLE 3-continued

| Item | Example 1 | Example 2 | Example 3 | Example 4 | Example 5 | Comparative Example 1 | Reference Example 1 |
|---|---|---|---|---|---|---|---|
| Tensile Strength (MPa) | 19.6 | 19.1 | 19.3 | 18.2 | 19.4 | 19.9 | 19.3 |
| Elongation (%) | 190 | 210 | 190 | 210 | 200 | 200 | 180 |
| Hardness Peak (Shore A) | 79 | 78 | 79 | 79 | 79 | 79 | 75 |

As can be seen from Table 2, in Examples 1 to 5 in which composite particles obtained using methacrylic acid were blended, an increase in ML after the 40° C. storage test was smaller than that in Comparative Example 1 in which composite particles obtained not using methacrylic acid were not blended, indicating that scorch stability was improved. Further, as can be seen from Table 3, there is almost no difference in the physical properties of the cross-linked rubber between Examples 1 to 5 and Reference Example 1, indicating that even if composite particles are blended, excellent physical properties equivalent to those of a conventional crosslinked product can be obtained.

The invention claimed is:

1. A composition comprising:
   a composite particle; and
   a fluorine-containing polymer, wherein
   the composite particle comprises a first polymer and an inorganic particle dispersed in the first polymer,
   the inorganic particle is an inorganic nitride particle, and
   the first polymer contains an acid group-containing monomer unit.

2. The composition according to claim 1, wherein the acid group-containing monomer unit is an unsaturated carboxylic acid unit.

3. The composition according to claim 1, wherein the acid group-containing monomer unit is a methacrylic acid unit.

4. The composition according to claim 1, wherein the first polymer contains the acid group-containing monomer unit in an amount of from 1 to 100 mol % with respect to all the monomer units.

5. The composition according to claim 1, wherein the fluorine-containing polymer is a fluoroelastomer.

6. The composition according to claim 1, wherein the composite particle is obtained by polymerizing an acid group-containing monomer in a dispersion in which the inorganic particle is dispersed.

7. The composition according to claim 1, wherein the composition is a molding material.

8. A molded article obtained from the composition according to claim 1.

9. The composition according to claim 1, wherein the composite particle consists of the first polymer and the inorganic particle dispersed in the first polymer.

10. The composition according to claim 1, wherein the inorganic nitride particle is selected from the group consisting of a silicon nitride particle, a lithium nitride particle, a titanium nitride particle, an aluminum nitride particle, a boron nitride particle, a vanadium nitride particle, and a zirconium nitride particle.

11. The composition according to claim 1, wherein the inorganic nitride particle is a silicon nitride particle.

12. The composition according to claim 1, wherein the fluorine-containing polymer is a fluorine-containing elastomer having a cyano group at a terminal of a main chain and/or in a side chain.

13. The composition according to claim 1, wherein the composite particle contains 50 to 80% by mass of the inorganic particle.

14. The composition according to claim 1, wherein the composition comprises the composite particle in an amount of from 0.1 to 5 parts by mass.

* * * * *